(12) United States Patent
Nagler (10) Patent No.: US 9,461,566 B2
(45) Date of Patent: Oct. 4, 2016

(54) DRIVE ARRANGEMENT FOR THE MOTORIZED ADJUSTMENT OF AN ADJUSTMENT ELEMENT OF A MOTOR VEHICLE

(75) Inventor: Toni Nagler, Bamberg (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 284 days.

(21) Appl. No.: 14/343,008

(22) PCT Filed: Aug. 24, 2012

(86) PCT No.: PCT/EP2012/003579
§ 371 (c)(1),
(2), (4) Date: Nov. 17, 2014

(87) PCT Pub. No.: WO2013/034253
PCT Pub. Date: Mar. 14, 2013

(65) Prior Publication Data
US 2015/0207437 A1    Jul. 23, 2015

(30) Foreign Application Priority Data
Sep. 5, 2011 (DE) .................... 10 2011 112 273

(51) Int. Cl.
*H02P 7/00* (2016.01)
*H02P 29/02* (2016.01)
(Continued)

(52) U.S. Cl.
CPC .............. *H02P 3/14* (2013.01); *E05F 15/611* (2015.01); *H02P 3/12* (2013.01); *E05Y 2400/32* (2013.01); *E05Y 2800/112* (2013.01); *E05Y 2900/546* (2013.01)

(58) Field of Classification Search
CPC ............. H02P 7/00; H02P 3/14; H02P 29/02
USPC ....... 318/264–266, 272, 275, 277, 280, 282, 318/286, 466–469, 626
See application file for complete search history.

(56) References Cited

U.S. PATENT DOCUMENTS

| 5,306,990 A | 4/1994 | Hofsaess et al. |
| 5,563,483 A * | 10/1996 | Kowall .................. E05B 81/14 318/266 |

(Continued)

FOREIGN PATENT DOCUMENTS

| DE | 1020050280 | 6/2006 |
| EP | 1783309 | 5/2007 |

(Continued)

OTHER PUBLICATIONS

PCT International Search Report from International Application No. PCT/EP2012/003579, corresponding to this matter, U.S. Appl. No. 14/343,008, mailed Dec. 4, 2012 (4 pages).

(Continued)

*Primary Examiner* — Bentsu Ro
(74) *Attorney, Agent, or Firm* — Pauly, Devries Smith & Deffner, LLC (57) ABSTRACT

The invention relates to a drive arrangement for the motorized adjustment of an adjustment element of a vehicle, wherein at least one drive comprising an electric drive motor and a drive control means and is connected to a supply, wherein the drive is designed in a non-self-locking manner, the drive motor operates as a generator and generates a generator voltage, wherein the drive control means has a driver unit for supplying electrical power to the at least one drive. The invention proposes that the drive control means has a switching device and has a detection device for detecting a non-motorized adjustment of the adjustment element, and that the drive control means, when a predetermined, non-motorized adjustment of the adjustment element is detected, connects the supply voltage to the supply connections of the driver unit by means of the switching device in one switching operation.

19 Claims, 4 Drawing Sheets

(51) Int. Cl.
*H02P 3/14* (2006.01)
*H02P 3/12* (2006.01)
*E05F 15/611* (2015.01)

(56) References Cited

U.S. PATENT DOCUMENTS

| | | | | |
|---|---|---|---|---|
| 6,297,605 | B1 * | 10/2001 | Butler | E05F 15/44 200/61.43 |
| 7,342,370 | B2 * | 3/2008 | Greene | B60N 2/0232 318/139 |
| 8,766,563 | B2 * | 7/2014 | Eggeling | G05B 19/416 318/432 |
| 2005/0062453 | A1 | 3/2005 | Sato | |
| 2009/0265989 | A1 | 10/2009 | Mueller et al. | |
| 2012/0013143 | A1 | 1/2012 | Schiegel | |
| 2013/0038251 | A1 | 2/2013 | Fukuoka et al. | |
| 2013/0038262 | A1 | 2/2013 | Fukuoka et al. | |

FOREIGN PATENT DOCUMENTS

| | | |
|---|---|---|
| FR | 2856452 | 12/2004 |
| JP | 1994030572 | 2/1994 |
| JP | 1996172704 | 7/1996 |
| WO | 2006/013368 | 12/2006 |
| WO | 2011/001358 | 2/2011 |

OTHER PUBLICATIONS

Search Report for German Patent Application No. 102011112273.0 related to U.S. Appl. No. 14/343,008, mailed Aug. 31, 2012 (5 pages).

* cited by examiner

DRIVE ARRANGEMENT FOR THE MOTORIZED ADJUSTMENT OF AN ADJUSTMENT ELEMENT OF A MOTOR VEHICLE

CROSS-REFERENCE TO RELATED APPLICATION

This application is a national stage application under 35 U.S.C. 371 of International Patent Application Serial No. PCT/EP 2012/003579, filed Aug. 24, 2012, which claims priority from German Patent Application No. DE 10 2011 112 273.0, filed Sep. 5, 2011, the disclosures of which are hereby incorporated by reference herein in their entirety.

FIELD OF THE INVENTION

The invention relates to a drive arrangement for the motorized adjustment of an adjustment element of a motor vehicle, and also to an adjustment element arrangement of a motor vehicle.

BACKGROUND

In the present case, the term "adjustment element" is to be understood to be all-encompassing. Said term covers tailgates, trunk lids, engine hoods, doors, in particular side doors, luggage compartment floors or the like, of a motor vehicle.

However, the drive arrangement under discussion is primarily used in tailgates and side doors in motor vehicles. It is used for the motorized adjustment of the respective adjustment element in the closing direction and in the opening direction. It is generally important in this case that the drive arrangement also permits manual adjustment operation, in addition to motorized adjustment operation. Manual adjustment operation is important particularly in the event of an emergency, for example in the event of a crash or in the event of a power failure.

A known drive arrangement (DE 20 2005 007 155 U1) is associated with a tailgate. The drive arrangement is equipped with two spindle drives which, in each case in a compact structural unit, have a drive motor, an intermediate gear mechanism with a clutch, and a spindle/spindle nut mechanism. A spring arrangement which counteracts the weight force of the associated tailgate is provided in the respective structural unit. The drive arrangement further has a drive control means which is used to actuate the two drives, in particular the two drive motors. The drives are equipped in a non-self-locking manner, and therefore manual operation can be realized in a simple manner.

The described drive arrangement can be used for the motorized adjustment of tailgates of considerable size and/or substantial weight. This creates new degrees of freedom when designing tailgates of this kind. However, the increase in weight is, in principle, also associated with an increased risk in the event of a failure of the drive components. For example, in the event of a fracture in the above spring arrangement, it is necessary to ensure that the tailgate does not drop in the closing direction in an unbraked manner due to gravity.

In the case of the known drive arrangement (WO 2010/083999 A1) on which the invention is based, an overvoltage protection means of the drive control means is used for the purpose of braking the drive in the event of a non-motorized adjustment of the adjustment element above the adjustment speed for normal operation in the short-circuit mode. In this case, the drive control means is equipped with a driver unit for supplying electrical drive power to the drive, said driver unit having a conventional H-bridge circuit.

In the case of the known drive arrangement, use is made of the fact that the drive motor operates as a generator in the event of a non-motorized adjustment and generates a generator voltage by means of which the overvoltage protection means of the drive control means can be triggered. Triggering of the overvoltage protection means leads in this case to short-circuiting of the respective drive motor, this leading to corresponding braking of the drive motor.

In the known drive arrangement, it is advantageous that rapid and heavy braking of the drive in the event of an emergency using simple means, and therefore a high level of operational reliability, are ensured. However, in the case of some applications, moderate braking would be desirable, and this would be perceived by the user as an increase in comfort.

The invention is based on the problem of designing and developing the known drive arrangement in such a way that the comfort of use is increased while the operational reliability is maintained.

SUMMARY

The fundamental insight that moderate braking of the respective drive motor can be implemented by the drive motor operating on the supply as a generator for braking purposes, and not being merely short-circuited, is important. In this case, the supply is generally the vehicle battery.

Specifically, the drive control means has a switching device for connecting the supply voltage to the driver unit and has a detection device for detecting a non-motorized adjustment of the adjustment element, wherein the drive control means, when a predetermined, non-motorized adjustment of the adjustment element is detected, connects the supply voltage to the supply connections of the driver unit by means of the switching device in one switching operation, so that the drive motor, as discussed above, operates on the supply as a generator and is accordingly braked.

By virtue of the proposed solution, the supply is fed to a certain extent by the drive motor which operates as a generator, this leading to the braking effect on the drive motor generally being lower than in the case of pure short-circuiting of the drive motor.

Furthermore, the probability of a generator voltage being produced at a level which triggers an overvoltage protection means of the drive control means is low, and this in turn could, as explained further above, lead to short-circuiting of the drive motor.

In an embodiment, the polarity-reversal protection means of the drive control means, in particular the switching device which is associated with the polarity-reversal protection means, is used to connect the supply voltage to the driver unit in the event of the predetermined, non-motorized adjustment, in order to effect the above braking operation. This dual use of the polarity-reversal protection means which is present in any case leads to a particularly simple realization.

In an embodiment, an overvoltage protection means is provided in addition to the polarity-reversal protection means, the said overvoltage protection means being triggered in the event of a limit generator voltage being exceeded and braking the drive motor in the short-circuit mode. In the event of extremely rapid, non-motorized operation, this may be advantageous primarily when the above connection of the supply voltage is associated with a certain response time. In a case such as this, it may be advantageous for the overvoltage protection means to briefly respond with a corresponding short-circuit braking operation, until the supply voltage is connected by means of the switching device as discussed above. As a result, the operational reliability can be increased in the case of an extremely rapid, non-motorized adjustment of the adjustment element.

According to a further teaching, the above problem is solved in the case of an adjustment element arrangement.

The proposed adjustment element arrangement is equipped with an adjustment element, in particular a tailgate, of a motor vehicle and with a proposed drive arrangement for the motorized adjustment of the adjustment element. Reference may be made to all embodiments which relate to the drive arrangement for explanation of this further teaching.

In an embodiment, the invention provides a drive arrangement for the motorized adjustment of an adjustment element of a motor vehicle, wherein at least one drive comprising an electric drive motor, such as DC motor, and a control means which is associated with the drive and is connected to a supply, such as a vehicle battery, having a supply voltage are provided, wherein the drive is designed in a non-self-locking manner, so that, in the event of a non-motorized adjustment of the adjustment element, the drive motor operates as a generator and generates a generator voltage, wherein the drive control means has a driver unit for supplying electrical power to the at least one drive, wherein the drive control means has a switching device for connecting the supply voltage to the driver unit and has a detection device for detecting a non-motorized adjustment of the adjustment element, and in that the drive control means, when a predetermined, non-motorized adjustment of the adjustment element is detected, connects the supply voltage to the supply connections of the driver unit by means of the switching device in one switching operation, so that the drive motor operates on the supply as a generator and is accordingly braked.

In an embodiment, the generator voltage of the drive motor acts on the supply connections of the driver unit by means of the driver unit, so that the drive motor operates on the supply as a generator and is accordingly braked when supply voltage is connected.

In an embodiment, the drive control means disconnects the supply voltage from the driver unit by means of the switching device in the stationary mode in any case.

In an embodiment, the drive control means has a control unit for actuating the driver unit.

In an embodiment, the drive control means, such as the control unit, can be moved to an operating mode, in which the closure element can be adjusted by motor, and to a power-saving standby mode, in that the supply voltage is connected to the supply connections of the driver unit by means of the switching device in the operating mode and is disconnected from the driver unit in the standby mode.

In an embodiment, the drive control means has a polarity-reversal protection means in respect of the polarity of the supply voltage, in that the switching device is a constituent part of the polarity-reversal protection means, and in that the switching device disconnects the supply voltage from the driver unit, or allows said supply voltage to be disconnected from said driver unit, when the polarity of the supply voltage is incorrect.

In an embodiment, the control unit is a constituent part of the polarity-reversal protection means and disconnects the supply voltage from the driver unit, or allows said supply voltage to be disconnected from said driver unit, by means of the switching device when the polarity of the supply voltage is incorrect.

In an embodiment, the switching device always disconnects the supply voltage from the driver unit when there is no actuation by the control unit, such as the control unit does not actuate the switching device when the polarity of the supply voltage is incorrect, such as the switching device is mechanically prestressed into a disconnecting switching position.

In an embodiment, the adjustment speed of a non-motorized adjustment of the closure element can be ascertained by means of the detection device, and in that the drive control means connects the supply voltage to the supply connections of the driver unit only when a switching adjustment speed is exceeded.

In an embodiment, the drive control means is equipped with an overvoltage protection means which can be triggered by a limit supply voltage being exceeded, and in that the arrangement is further made such that the overvoltage protection means can also be triggered by a non-motorized adjustment of the adjustment element when a limit generator voltage is exceeded, such as the overvoltage protection means electrically couples, such as short-circuits, the connections of the drive motor to one another in the triggered state, and therefore brakes the drive motor.

In an embodiment, the arrangement is made such that the overvoltage protection means can only be triggered by a non-motorized adjustment of the adjustment element if, when the supply voltage is disconnected, the adjustment speed lies above a limit adjustment speed which is greater than the switching adjustment speed.

In an embodiment, the driver unit has an H-bridge circuit comprising two low-side switches and two high-side switches for actuating the drive motor, such as the H-bridge circuit has two half-bridges which each have one of the low-side switches and one of the high-side switches, such as the low-side switches and the high-side switches are designed as MOSFETs, and in that the arrangement is made such that the generator voltage acts at least partially on the supply connections of the H-bridge circuit by means of the body diodes of a high-side switch of one half bridge and of a low-side switch of the other half bridge of the H-bridge circuit.

In an embodiment, two drives are provided, in that the drive control means has a driver unit, such as an H-bridge circuit, for actuating the drive motors of the drives in each case, and in that the respectively corresponding supply connections of the driver units, such as the H-bridge circuits, are connected, and in that the supply voltage can be connected to the supply connections of the two driver units, such as the two H-bridge circuits, by means of the switching device.

In an embodiment, the adjustment element is designed as a tailgate, as a trunk lid, as an engine hood, as a door, such as side door, or as a luggage compartment floor of the motor vehicle.

In an embodiment, an adjustment element arrangement of a motor vehicle comprising an adjustment element, such as a tailgate, and comprising a drive arrangement for the motorized adjustment of the adjustment element described herein is provided.

BRIEF DESCRIPTION OF THE FIGURES

The invention will be explained in greater detail below with reference to a drawing which illustrates only one exemplary embodiment. In the drawing.

DETAILED DESCRIPTION

Figure 1:
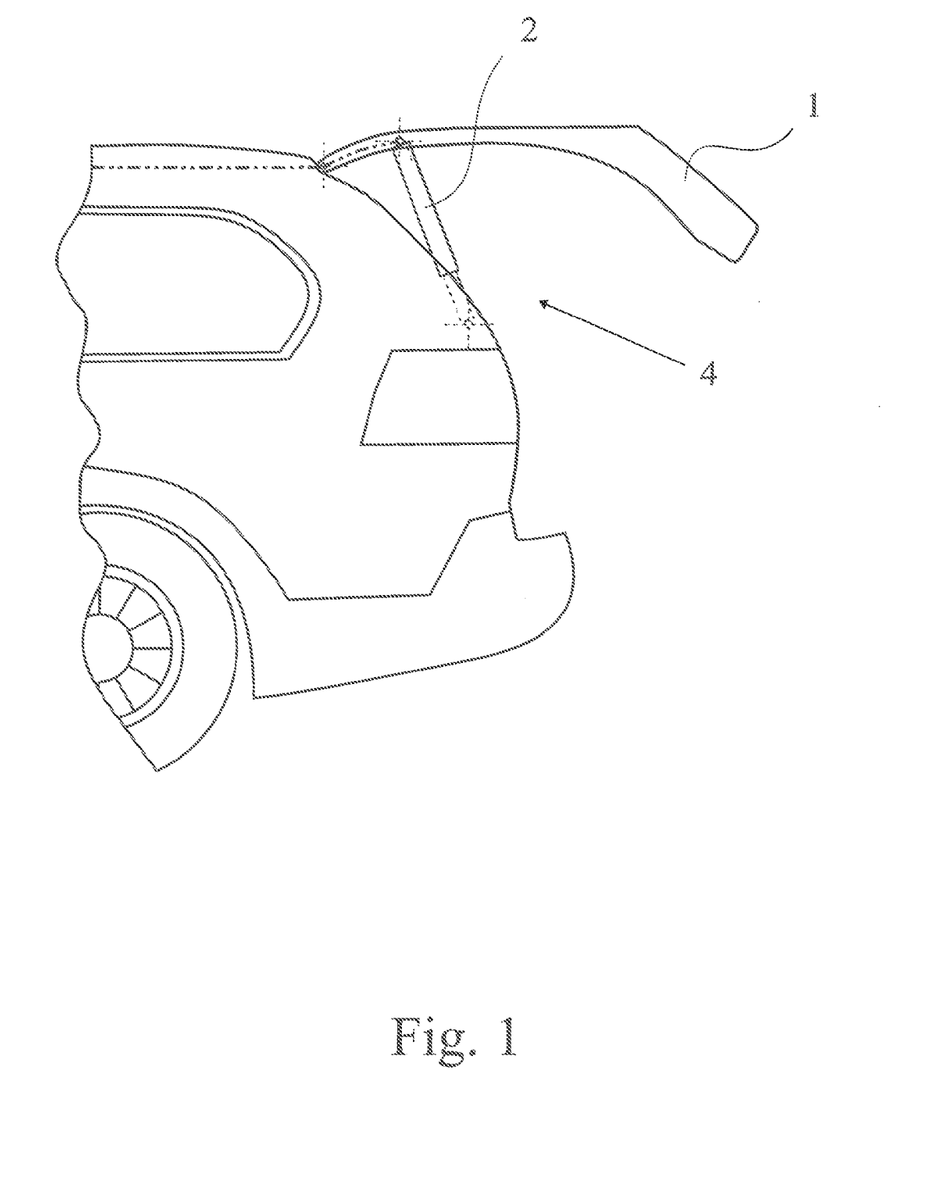
FIG. 1 shows a side view of the rear of a motor vehicle comprising a tailgate and a proposed drive arrangement for the motorized adjustment of the tailgate.

The drive arrangement which is illustrated in FIG. 1 is used for the motorized adjustment of a tailgate 1 of a motor vehicle. However, all other adjustment elements which are discussed in the introductory part of the description can also be advantageously used. All of the following embodiments relating to a tailgate correspondingly equally apply for all of the other adjustment elements discussed in the introductory part.

Figure 2:
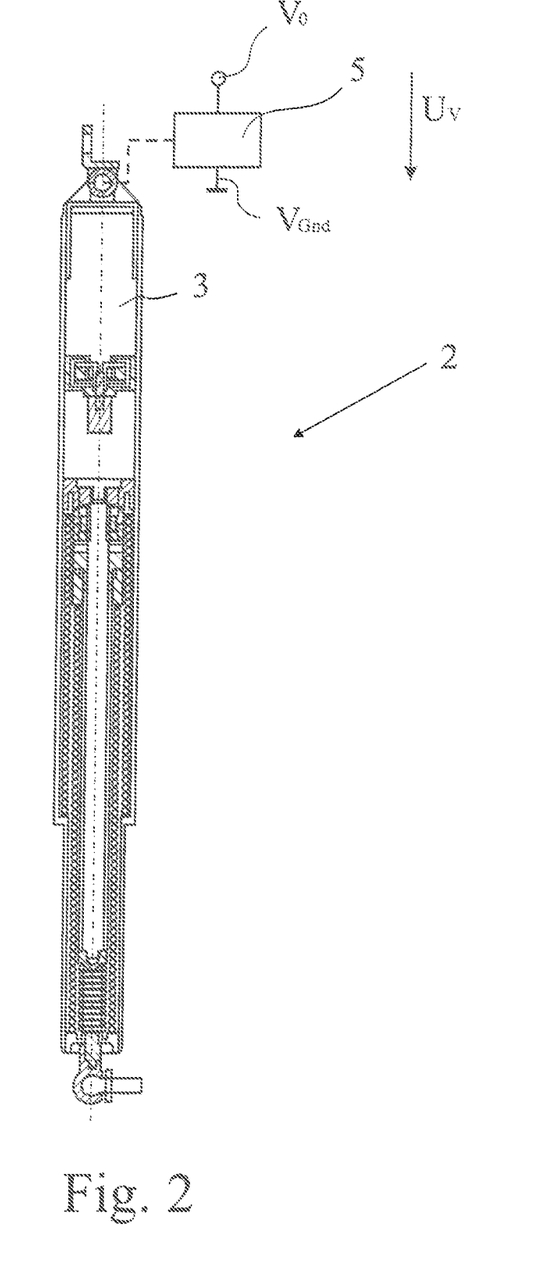
FIG. 2 shows a sectional illustration through one of the two drives of the drive arrangement according to FIG. 1.

The drive arrangement which is illustrated in FIG. 1 has two associated identical drives 2 which each have a drive motor 3. The drives 2 are arranged in the two side regions of a tailgate opening 4. Only one of the two drives 2 is illustrated in FIG. 1. FIG. 2 shows a side view of this drive 2. The following embodiments relate only to the drive 2 which can be seen in FIG. 1. However, they equally apply for any further drives which may be present.

The drive 2 can include a DC motor. However, it is also feasible for an AC motor to be used here.

The drive arrangement is further equipped with a drive control means 5 which is associated with the drive 2 and is connected in a conventional manner to a supply V with a supply voltage $U_V$. In this case, "supply" very generally means the device which supplies the supply voltage $U_V$ to the on-board electrical system. In this case, the said supply is generally a vehicle battery which is only schematically illustrated in FIG. 3. However, it is also feasible for the supply V to have circuit components for voltage stabilization and/or for voltage smoothing. The supply voltage $U_V$ is produced by the potential difference between supply potential $V_0$ and earth potential $V_{Gnd}$.

In an embodiment, the drive control means 5 is associated with the two drives 2. However, it is also feasible for each drive 2 to have its own associated drive control means 5.

The proposed drive arrangement allows for manual adjustment of the tailgate 1 without a relatively great deal structural expenditure since the drive 2 is designed in a non-self-locking manner. This means that, in the event of non-motorized, in particular manual, adjustment of the tailgate 1 by virtue of spring force or gravity, the drive motor 3 operates as a generator. In the process, the drive motor 3 generates a corresponding generator voltage $U_G$.

The drive control means 5 has a driver unit 6 for supplying electrical drive power to the drive 2. Various options for designing the driver unit 6 are known from the prior art. In this case, an option involves equipping the driver unit 6 with an H-bridge circuit which is still to be explained.

Figure 3:
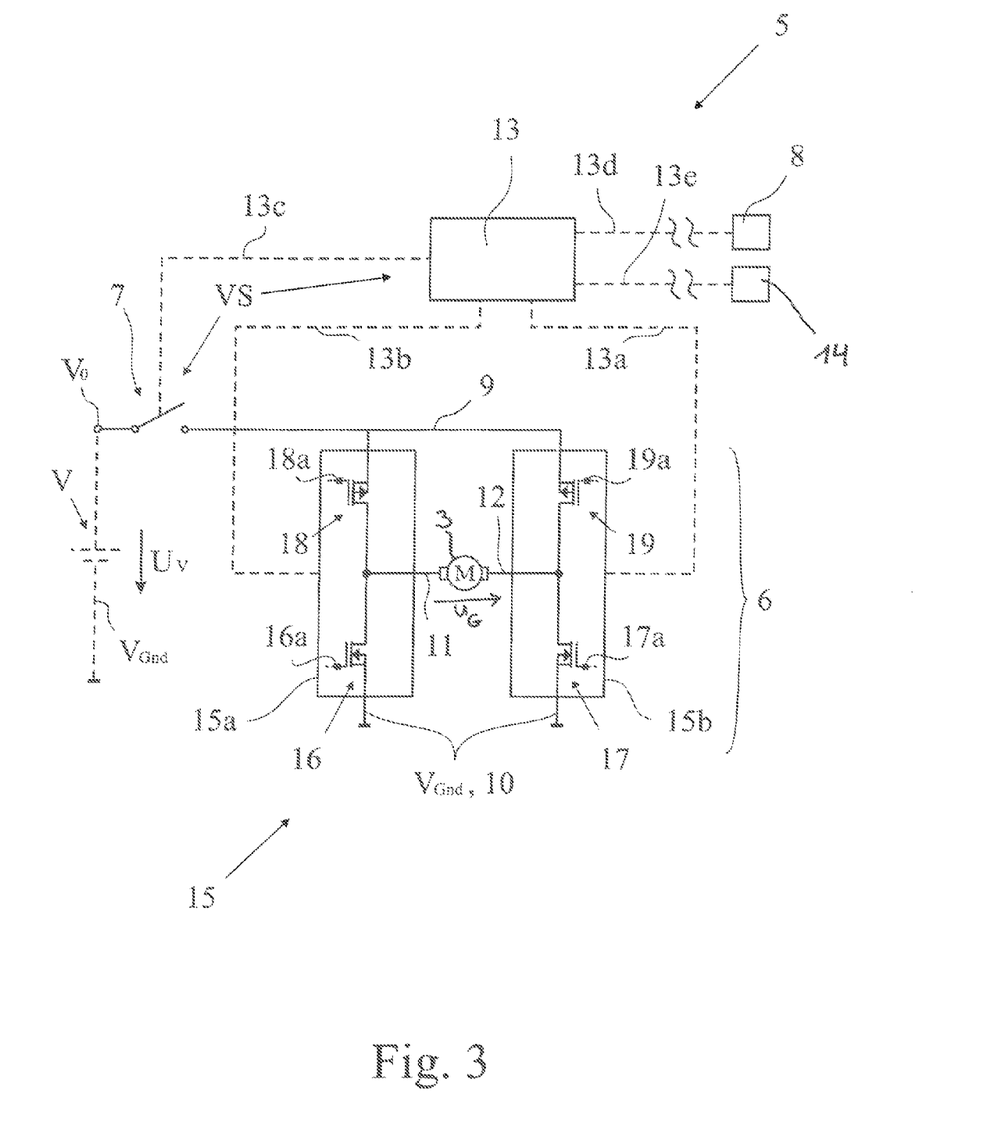
FIG. 3 shows an entirely schematic illustration of the control unit and of the driver unit of the drive control means for the drive according to FIG. 2.

FIG. 3 shows that the drive control means 5 has a switching device 7 for connecting the supply voltage $U_V$ to the supply connections 9, 10 of the driver unit 6. This switching device 7 can be a constituent part of a polarity-reversal protection means VS, as will be explained.

In the present case, the term "connection of the supply voltage" is to be understood broadly and comprises both the connection of the supply potential $V_0$ and also the connection of the earth potential $V_{Gnd}$ to the supply connections 9, 10 of the driver unit 6. In the illustrated embodiment, only the supply potential $V_0$ is connected, as can be gathered from the illustration according to FIG. 3.

The drive control means 5 is further equipped with a detection device 8 for detecting a non-motorized adjustment of the tailgate 1. Numerous options are known for the purpose of realizing the detection device 8. The drive 2, in this case the spindle drive 2, can be equipped with an incremental sensor which, can be designed as a Hall sensor. All other types of sensors can be used in this case.

The detection device 8 can also be associated with the tailgate 1, so that the tailgate adjustment is detected directly, and not indirectly by means of an adjustment of the drive 2.

There is always non-motorized adjustment of the tailgate for the drive control means 5 when an adjustment of the tailgate 1 has been detected by the detection device 8 without the driver unit 6 having being actuated.

In this case, it is important that the drive control means 5, when a predetermined, non-motorized adjustment of the tailgate 1 is detected, connects the supply voltage $U_V$ to the supply connections 9, 10 of the driver unit 6 by means of the switching device 7 in one switching operation, so that the drive motor 3 operates on the supply V as a generator, and is accordingly braked.

In the present case, the term "predetermined motorized adjustment of the adjustment element" means that each detection of a non-motorized adjustment of the adjustment element 1 does not necessarily lead to a proposed switching operation. Rather, the switching process can be performed only when a switching adjustment speed is exceeded. This is explained in detail further below One point of interest in the proposed solution is the fact that, in the event of the predetermined, non-motorized adjustment of the adjustment element 1, a charging current is conducted from the drive motor 3, which operates as a generator, to the load V to a certain extent. At a supply voltage $U_V$ which is different from zero, this charging current is always less than the short-circuit current which is established when motor connections 11, 12 are short-circuited, and therefore the resulting braking action is less than the braking action which is caused by a short-circuit braking operation.

In the case of the illustrated embodiment, the generator voltage $U_G$ of the drive motor 3 acts on the supply connections 9, 10 of the driver unit 6 by means of the driver unit 6, so that the drive motor 3 operates on the supply V as a generator and is accordingly braked when, as explained above, supply voltage $U_V$ is connected. Closing the switching device 7 which is illustrated in FIG. 3 is sufficient for connecting the supply voltage $U_V$ to the supply connections 9, 10.

The way in which the generator voltage $U_G$ of the drive motor 3 acts specifically on the supply connections 9, 10 of the driver unit 6 by means of the driver unit 6 will be explained in greater detail further below with reference to a driver unit 6 comprising an H-bridge circuit.

In particular in order to reduce losses in a stationary mode as far as possible, provision can be made for the drive control means 5 to disconnect the supply voltage $U_V$ from the driver unit 6 by means of the switching device 7 in the stationary mode in any case. In this case, the supply voltage $U_V$ is connected to the driver unit 6 when motorized adjustment is intended to take place or when an above, predetermined, non-motorized adjustment of the adjustment element 1 has been detected.

The drive control means 5 can be equipped with a control unit 13 in order to actuate the driver unit 6. The control unit 13 can also takes on the function of a regulation means which converts the predetermined adjustment movement profiles. Furthermore, the control unit 13 also takes on the actuation of the switching unit 7 in this case. Accordingly, the control unit 13 is coupled to the driver unit 6 by means of the control lines 13a, 13b, to the switching device 7 by means of the control line 13c, and to the detection device 8 by means of the control line 13d.

The control unit 13 is generally a microcontroller which is positioned in a decentralized manner in the region of the drive arrangement. However, it is also feasible for the control unit 13 to be a constituent part of a central motor vehicle control means.

The drive control means 5, such as the control unit 13, can be moved, for the purpose of power-saving operation, not only to an operating mode in which the tailgate 1 can be adjusted by motor, but also to a power-saving standby mode. Only those sections of the control unit 13 which are required for later waking up the control unit 13, that is to say for moving the control unit 13 to the operating mode, are generally activated in the standby mode. The control unit 13 can be woken up by user operation by means of an operating device 14 which is coupled to the control unit 13 by means of a control line 13e. An operating device 14 of this kind can be a pushbutton which is arranged on the tailgate 1, or the like.

The supply voltage $U_V$ can be connected to the supply connections 9, 10 of the driver unit 6 by means of the switching device 7 in the operating mode, and is disconnected from the driver unit 6 in the standby mode. This is also particularly advantageous in respect of realizing a polarity-reversal protection means VS. In a particularly refinement, the drive control means 5 is equipped specifically with a polarity-reversal protection means VS in respect of the correct polarity of the supply voltage $U_V$, wherein the switching device 7 can be a constituent part of the polarity-reversal protection means VS. The function of the polarity-reversal protection means VS is to disconnect the supply voltage $U_V$ from the driver unit 6, or allow said supply voltage to be disconnected from said driver unit, when the polarity of the supply voltage $U_V$ is incorrect.

In an embodiment, the control unit 13 is a constituent part of the polarity-reversal protection means VS, wherein the control unit 13 disconnects the supply voltage $U_V$ from the driver unit 6, or allows said supply voltage to be disconnected from said driver unit, by means of the switching device 7 when the polarity of the supply voltage $U_V$ is incorrect.

Specifically, the arrangement is made such that the switching device 7 always disconnects the supply voltage $U_V$ from the driver unit 6 when there is no actuation by the control unit 13, and the control unit 13 does not actuate the switching device 7 when the polarity of the supply voltage $U_V$ is incorrect. In a refinement, the switching device 7 is mechanically prestressed into a disconnecting switching position in this case. This is the case when the switching device 7 is designed as an electromechanical relay.

It has already been noted that the proposed connection of the supply voltage $U_V$ to the supply connections 9, 10 of the driver unit 6 is intended to take place only in the event of a predetermined, non-motorized adjustment of the tailgate 1. In an embodiment, the adjustment speed of a non-motorized adjustment of the tailgate 1 can be ascertained by means of the detection device 8, and the drive control means 5 connects the supply voltage $U_V$ to the driver unit 6 only when a switching adjustment speed is exceeded. This ensures that slow and therefore non-hazardous, non-motorized adjustment movements of the tailgate 1, such as manual adjustment movements in line with normal operation, can be performed in an unbraked manner. Braking is performed only after a predetermined switching adjustment speed, which occurs in the event of an emergency for example, is exceeded.

In an embodiment, the drive control means 5 is also equipped with an overvoltage protection means US which is discussed in the introductory part of the description and can be triggered by a limit supply voltage $U_V$ being exceeded. In this case, the arrangement is further made such that the overvoltage protection means US can also be triggered by a non-motorized adjustment of the tailgate 1 when a limit generator voltage $U_G$ is exceeded. In a refinement, the overvoltage protection means US electrically couples the motor connections 11, 12 of the drive motor 3 to one another in the triggered state, as a result of which the drive motor 3 is again braked. In an embodiment, triggering of the overvoltage protection means US leads to short-circuiting of the motor connections 11, 12.

Therefore, overall, two mechanisms for braking the drive motor 3 in the event of non-motorized adjustment of the tailgate 1 are provided. In this case, the arrangement can be made such that the overvoltage protection means US can only be triggered by a non-motorized adjustment of the tailgate 1 if, when the supply voltage $U_V$ is disconnected from the driver unit 6, the adjustment speed lies above a limit adjustment speed which is, in turn, greater than the switching adjustment speed. This means that the drive motor 3 is braked fundamentally by the switching device 7 in the event of non-motorized adjustment of the tailgate 1. One exception is in the case of an extremely rapid non-motorized adjustment of the tailgate 1 when the supply voltage $U_V$ is still disconnected, this leading to triggering of the overvoltage protection means US. Therefore, the overvoltage protection means US provides additional security in the case of extreme non-motorized adjustment movements of the tailgate 1.

The manner of operation of an above overvoltage protection means US and its use for braking the tailgate 1 is the subject matter of patent application WO 2010/083999 A1 which was published by the same applicant and of which the content, in its entirety, is included in the subject matter of the present application.

Figure 4:
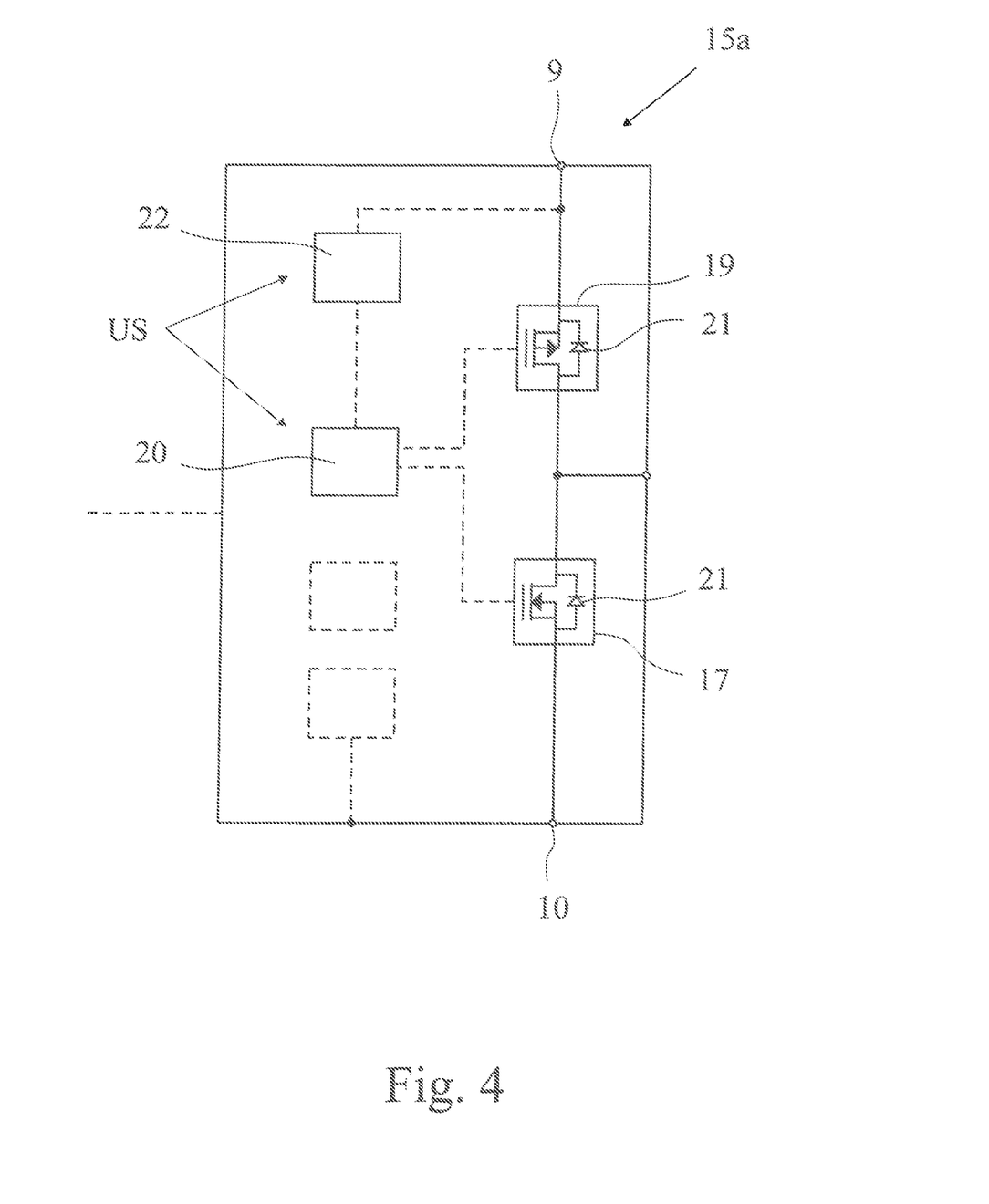
FIG. 4 shows a block diagram of a half-bridge module of the H-bridge circuit according to FIG. 3.

As shown in FIGS. 3 and 4, the drive control means 5 is equipped with an H-bridge circuit 15 comprising two low-side switches 16, 17 and two high-side switches 18, 19 for actuating the drive motor 3. The H-bridge circuit 15 is usually constructed with two half-bridges 15a, 15b which each have one of the low-side switches 16, 17 and one of the high-side switches 18, 19. The low-side switches 16, 17 and the high-side switches 18, 19 are connected in series in respect of their switching outputs. The motor connections 11, 12 of the drive motor 3 are connected to the contact points of the pairs of switches 16, 18; 17, 90 which are connected in series in each case.

In an embodiment, the overvoltage protection means US connects the two high-side switches 18, 19 and blocks the two low-side switches 16, 17 in the triggered state. However, it is also feasible, conversely, for the two low-side switches 16 and 17 to be connected and the two high-side switches 18, 19 to be blocked in the triggered state of the overvoltage protection means US. In the two above-mentioned cases, the drive motor 3 is short-circuited and is in the braking mode.

A series of advantageous variants for realizing the low-side switches 16, 17 and the high-side switches 18, 19 are feasible. In an embodiment, said switches 16, 17, 18, 19 are designed as MOSFETs, wherein the low-side switches 16, 17 are N-channel MOSFETs and the high-side switches 18, 19 are P-channel MOSFETs. The gate connections 16*a*, 17*a*, 18*a*, 19*a* of the switches 16, 17, 18, 19 are coupled to a logic unit 20 which is illustrated only in FIG. 4 which is still to be explained.

The arrangement is now made such that the generator voltage is at least partially connected to the supply connections 9, 10 of the driver unit 6, in this case the H-bridge circuit 15, by means of the body diodes 21 of a high-side switch 18, 19 of one half bridge 15*a*, 15*b* and of a low-side switch 16, 17 of the other half bridge 15*a*, 15*b* of the H-bridge circuit.

The existence of the body diodes 21 is inherent in MOSFET switching elements. For illustration purposes, the body diodes 21 are illustrated as discrete components in FIG. 4 which is still to be explained. When the supply voltage $U_V$ is connected to the supply connections 9, 10 of the driver unit 6 by means of the switching device 7, the charging current of the drive motor 3, which is operated as a generator, flows across the body diodes 21 and across the switching device 7 to the load V, this causing the described braking of the drive motor 3, in the event of non-motorized adjustment of the tailgate 1. FIG. 3 shows that the generator voltage $U_G$ is partially connected to the supply voltage $U_V$ in any case, it being possible for this to lead briefly to a fluctuation in the supply voltage $U_V$ in any case. However, the fluctuation in the supply voltage $U_V$ moves within acceptable limits owing to the rapid charging compensation between the drive motor 3, which operates as a generator, and the supply V.

The proposed drive control means 5 comprising standard components can be realized in a cost-effective manner by the two half bridges 15*a*, 15*b* of the H-bridge circuit 15 each being designed as integral part-bridge modules, and by the two half-bridge modules each being equipped with a separate overvoltage protection means US. In this case, "integrated" means that the half-bridge modules are integrated circuits. FIG. 4 shows the basic construction of a half-bridge module of this kind.

The half-bridge module which is illustrated in FIG. 4 is equipped with a logic unit 20 for actuating the low-side switch 16 and the high-side switch 18. In this case, the overvoltage protection means US of the two half-bridge modules in each case has a detection unit 22, which is connected to the logic unit 20, for detecting whether the supply voltage $U_V$ has exceeded the limit supply voltage.

It has already been noted that the drive arrangement can have two drives 2, wherein the drive control means 5 for actuating the drive motors 3 of the drives 2 in each case has a driver unit 6, in an embodiment a H-bridge circuit 15 in each case, wherein the respectively corresponding supply connections 9, 10 of the driver units 6, in an embodiment the H-bridge circuits 15, are connected to one another, and wherein the supply voltage $U_V$ can be connected to the supply connections 9, 10 of the two driver units 6, in an embodiment the two H-bridge circuits 15, by means of the switching device 7.

The proposed solution can be used for all possible adjustment elements 1 of a motor vehicle. The adjustment element 1 can include a tailgate, a trunk lid, an engine hood, a door, in particular side door, or a luggage compartment floor, of a motor vehicle.

According to a further teaching, which is likewise granted independent significance, an adjustment element arrangement of a motor vehicle comprising an adjustment element 1, in particular a tailgate 1, and comprising an above-described, proposed drive arrangement with the motorized adjustment of the adjustment element 1 is claimed. Reference may be made to the above statements in their entirety in respect of the proposed drive arrangement.

The invention claimed is:

1. A drive arrangement for the motorized adjustment of an adjustment element of a motor vehicle, wherein at least one drive comprising an electric drive motor and a control means which is associated with the drive and is connected to a supply having a supply voltage are provided, wherein the drive is designed in a non-self-locking manner, so that, in the event of a non-motorized adjustment of the adjustment element, the drive motor operates as a generator and generates a generator voltage, wherein the drive control means has a driver unit for supplying electrical power to the at least one drive, wherein the drive control means has a switching device for connecting the supply voltage to the driver unit and has a detection device for detecting a non-motorized adjustment of the adjustment element, and in that the drive control means, when a predetermined, non-motorized adjustment of the adjustment element is detected, connects the supply voltage to the supply connections of the driver unit by means of the switching device in one switching operation, so that the drive motor operates on the supply as a generator and is accordingly braked;

wherein the drive control means has a polarity-reversal protection means in respect of the polarity of the supply voltage, in that the switching device is a constituent part of the polarity-reversal protection means, and in that the switching device disconnects the supply voltage from the driver unit, or allows said supply voltage to be disconnected from said driver unit, when the polarity of the supply voltage is incorrect.

2. The drive arrangement according to claim 1, wherein the generator voltage of the drive motor acts on the supply connections of the driver unit by means of the driver unit, so that the drive motor operates on the supply as a generator and is accordingly braked when supply voltage is connected.

3. The drive arrangement according to claim 1 wherein the drive control means disconnects the supply voltage from the driver unit by means of the switching device in the stationary mode in any case.

4. The drive arrangement according to claim 1 wherein the drive control means has a control unit for actuating the driver unit.

5. The drive arrangement according to claim 1 wherein the drive control means can be moved to an operating mode, in which the closure element can be adjusted by motor, and to a power-saving standby mode, in that the supply voltage is connected to the supply connections of the driver unit by means of the switching device in the operating mode and is disconnected from the driver unit in the standby mode.

6. The drive arrangement according to claim 1 wherein the control unit is a constituent part of the polarity-reversal protection means and disconnects the supply voltage from the driver unit, or allows said supply voltage to be disconnected from said driver unit, by means of the switching device when the polarity of the supply voltage is incorrect.

7. The drive arrangement according to claim 1 wherein the switching device always disconnects the supply voltage from the driver unit when there is no actuation by the control unit.

8. The drive arrangement according to claim 7, wherein the switching device is mechanically prestressed into a disconnecting switching position.

9. The drive arrangement according to claim 1 wherein the adjustment speed of a non-motorized adjustment of the closure element can be ascertained by means of the detection device, and in that the drive control means connects the supply voltage to the supply connections of the driver unit only when a switching adjustment speed is exceeded.

10. The drive arrangement according to claim 1 wherein the drive control means is equipped with an overvoltage protection means which can be triggered by a limit supply voltage being exceeded, and in that the arrangement is further made such that the overvoltage protection means can also be triggered by a non-motorized adjustment of the adjustment element when a limit generator voltage is exceeded.

11. The drive arrangement according to claim 10, wherein the arrangement is made such that the overvoltage protection means can only be triggered by a non-motorized adjustment of the adjustment element if, when the supply voltage is disconnected, the adjustment speed lies above a limit adjustment speed which is greater than the switching adjustment speed.

12. The drive arrangement according to claim 10, wherein the overvoltage protection means electrically couples the connections of the drive motor to one another in the triggered state, and therefore brakes the drive motor.

13. The drive arrangement according to claim 1 wherein the driver unit has an H-bridge circuit comprising two low-side switches and two high-side switches for actuating the drive motor and in that the arrangement is made such that the generator voltage acts at least partially on the supply connections of the H-bridge circuit by means of the body diodes of a high-side switch of one half bridge and of a low-side switch of the other half bridge of the H-bridge circuit.

14. The drive arrangement according to claim 13, wherein the H-bridge circuit comprises two half-bridges, which each comprise one of the low-side switches and one of the high-side switches.

15. The drive arrangement according to claim 1 wherein two drives are provided, in that the drive control means has a driver unit for actuating the drive motors of the drives in each case, and in that the respectively corresponding supply connections of the driver units are connected, and in that the supply voltage can be connected to the supply connections of the two driver units by means of the switching device.

16. The drive arrangement according to claim 15, wherein the driver unit, comprises an H-bridge circuit.

17. The drive arrangement according to claim 1 wherein the adjustment element is designed as a tailgate, as a trunk lid, as an engine hood, as a door or as a luggage compartment floor of the motor vehicle.

18. An adjustment element arrangement of a motor vehicle comprising an adjustment element and comprising a drive arrangement for the motorized adjustment of the adjustment element according to claim 1.

19. The drive arrangement according to claim 1, wherein the supply comprises a vehicle battery.

\* \* \* \* \*